United States Patent [19]

McCleary

[11] 4,080,422

[45] Mar. 21, 1978

[54] METHOD FOR PRODUCING INSOLUBLE CALCIUM SULFATE ANHYDRITE

[75] Inventor: Robert E. McCleary, Geneva, Ill.

[73] Assignee: United States Gypsum Company, Chicago, Ill.

[21] Appl. No.: 591,961

[22] Filed: Jun. 30, 1975

[51] Int. Cl.² .................................................. C04B 11/02
[52] U.S. Cl. ........................................................ 423/172
[58] Field of Search ....................... 423/171, 172, 555; 432/14; 241/1-30

[56] References Cited

U.S. PATENT DOCUMENTS

| | | | |
|---|---|---|---|
| 1,746,294 | 2/1930 | Tyler | 423/172 |
| 3,221,082 | 11/1965 | Leatham et al. | 423/169 |
| 3,312,455 | 4/1967 | Chassevent et al. | 423/171 |
| 3,648,994 | 3/1972 | Remmers et al. | 423/555 |
| 3,773,892 | 11/1973 | Reimann et al. | 423/172 |
| 3,829,280 | 8/1974 | Jenne et al. | 423/638 |
| 3,862,294 | 1/1975 | Engelhart et al. | 432/14 |

*Primary Examiner*—O. R. Vertiz
*Assistant Examiner*—Wayne A. Langel
*Attorney, Agent, or Firm*—Kenneth E. Roberts; Robert H. Robinson; Samuel Kurlandsky

[57] ABSTRACT

Naturally occurring or man-produced calcium sulfate dihydrate is subjected to a process which involves concomitant flash calcination, utilizing co-current contact of the gypsum with a gaseous heat source, and self-comminutation to produce the insoluble calcium sulfate anhydrite in relatively pure and finely comminuted form without the use of specially-sized feed rock and extensive mechanically motivated grinding of the product required by prior means known in this art.

9 Claims, 7 Drawing Figures

600 X

600 X

600 X

100 X

4,080,422

METHOD FOR PRODUCING INSOLUBLE CALCIUM SULFATE ANHYDRITE

BACKGROUND OF THE INVENTION

1. Field of the Invention

This invention relates to the conversion of "land plaster" or of synthetically produced calcium sulfate dihydrate powder to the relatively insoluble or "dead-burned" calcium sulfate anhydrite; and more particularly to such a process in which the particles being processed undergo a "self-grinding" comminution without the use of extensive mechanically motivated size-reducing means or mechanisms known in this art.

"Land plaster" is a ground, as-mined gypsum and is predominately calcium sulfate dihydrate with some varying small amounts of calcium sulfate anhydrite and other mineral impurities.

"Dead burned" anhydrite, in comparison to soluble anhydrite which will set rapidly when mixed with water, is the anhydrous salt of gypsum which re-hydrates in water very slowly. Due to such characteristic it is emminently suitable for many chemical processing uses such as fillers both in the chemical processing areas of plastics, paints and the like and in the food area provided that the product meets governmental standards for purity. It is well known in the art to roast or calcine the gypsum rock to convert the calcium sulfate dihydrate ($CaSO_4 \cdot 2H_2O$) with heat to calcium sulfate anhydrite ($CaSO_4$). The generally accepted method of doing this, however, involves the use of "beehive" kilns in which 4 to 12 inch sized rocks are placed and then subjected to calcination by high temperature air circulation (900° to 1250° F) for extremely long periods of time (60–80 hours), followed by extensive grinding of the large sized calcined rock by crushers and impact or attrition mills to produce a uniformly sized extremely fine calcium sulfate anhydrite powder. Such a process is both labor and energy intensive; is a batch process; and requires considerable time for the processing of each batch. Further, many of the resultant end uses of the calcium sulfate anhydrite in insoluble form call for extreme uniformity of color and a minimum of mineral impurities. These additional requirements may necessitate washing and the hand selection of individual pieces of rock for processing. In addition the calcined rock then must be ground, and this necessitates the addition of intermediate product storage facilities; additional apparatus and means to perform the grinding; and further processing time.

2. Description of the Prior Art

In another typical prior art procedure, calcination is accomplished in rotating kilns, either inclined slightly from the horizontal or provided vertically with lifting movable shelves. Such rotary kilns still further require specially-sized feed material and the additional and separate steps of mechanically grinding the resultant product.

In a somewhat related, though distantly, series of endeavors in this field, it is known to continuously calcine crushed gypsum in heated air or hot gases to produce a partial calcination to the "Plaster of Paris" or hemihydrate state ($CaSO_4 \cdot \frac{1}{2} H_2O$). This is illustrated in U.S. Pat. No. 1,984,201 disclosing continuously introducing crushed gypsum into a grinding mill to which heated air of hot gases are also introduced. This effects a cocommitant grinding by mechanical means since the calcining apparatus is also and principally a comminution apparatus. U.S. Pat. No. 3,648,994 also discloses calcining gypsum in a current of heating gas to plaster products, but in a cyclone plant wherein the current of heating gas and calcining product is in a vortex stream. This process again is followed by a mechanical, separate and additional grinding step, and also relates to the preparation of water soluble products.

In an unrelated area of endeavor and different field of interest, it is known to "exfoliate" certain inorganic minerals wherein there is an increase in dimension of the individual particles by heat treatment. Representative patents of interest in this area include U.S. Pat. Nos. 2,531,975; 2,572,483; 2,619,776; 2,763,479; and 3,097,832. As being related to this area there should also be mentioned U.S. Pat. No. 3,862,294 which discloses calcining certain inorganic mineral materials to their oxides using co-current contact with a gaseous heat source without any mention of change of particle size.

SUMMARY OF THE INVENTION

It is therefore an object and advantage of the present invention to provide a process for calcining ground gypsum (land plaster) to insoluble calcium sulfate anhydrite at a minimal retention time utilizing co-current contact with a gaseous heat and cocommitant comminutation of the calcining particles without the use of mechanically motivated grinding mechanisms known in this art.

Another object and advantage is the provision of means for continuously processing calcium sulfate dihydrate to insoluble calcium sulfate anhydrite.

Still another object and advantage is the provision of means for producing an insoluble anhydrite filler from gypsum rock which has an improved index of reflectivity over that of the starting material.

Another object and advantage is to provide a processing self-comminution to a state of form that has 4 to 7 times the surface area than the feed material.

Another object and advantage is to provide resultant particles that are of more uniform smaller size and more amorphous form than the slim, needle-like, larger crystals of prior processes thus permitting greater particle packing in further uses.

The fulfillment of the above and other objects and advantages of the present invention are accomplished by the steps of pre-grinding gypsum rock, or other natural or synthesized gypsum feed material to a surface area of 800 to 2000 square centimeters per gram; rapidly heating the feed particles in a calcining zone with hot gases, entering the heating zone at a temperature of 1500°–2400° F in co-current contact; maintaining linear flow of the particles and hot gases in the calcining zone for a time sufficient to drive off the water of crystallization from the particles; and withdrawing insoluble calcium sulfate anhydrite which has been reduced in particle size from the feed material by a factor of 4 to 7 times. The calcining zone is maintained in a linear co-current flowing contact of the solids feed material with the heated gases for movement of the solids material through the processing unit in contrast with any sort of turbulent, cyclonic vortex flow. Further, the feed material is not pre-heated before direct injection into the hot air area of the calcination apparatus; since, while the underlying theory for the size reduction in intimate co-current gas contact without using mechanically motivated size reduction equipment or devices associated with the prior art in this field is not clearly understood, it is believed that the injection of the cool feed material instantaneously into the hottest part of the calcination zone causes such a rapid vaporization and evolution of the associated two molecules of water of crystallization in the gypsum dihydrate out of its molecular structure that the gypsum particle mass is disrupted. This results in a 4 to 7 fold size reduction of the particles as they disrupt. Yet there is no apparent decomposition to the oxide form or other chemical decomposition forms and the remaining portions of the gypsum molecule do hold together as calcium sulfate. The hot gases entering the heating zone are at a temperature of 1500° to 2400° F, while the temperature of the feed materials entering the heating zone are at ambient temperature; and the resident time for calcination is in the order of 1 to 5 seconds.

BRIEF DESCRIPTION OF THE DRAWINGS

The invention will be more readily understood by reference to the ensuing description of the preferred embodiments and reference to the accompanying drawings in which.

DETAILED DESCRIPTION OF THE PREFERRED EMBODIMENTS

A basic concept to this invention is effecting an approximately 4 to 7 times or greater self-comminution of the feed particles during a rapid calcination, without effecting chemical decomposition of the particles. Thereby there is removed only water of crystallization without any of the chemical alterations and chemical decomposition forms characteristic of one unrelated art; without the growth in particle size characteristic of another unrelated art; and characterized in a greatly reduced contact or retention time without extensive mechanical grinding of the product of the prior means known in this directly related art.

Figure 1:
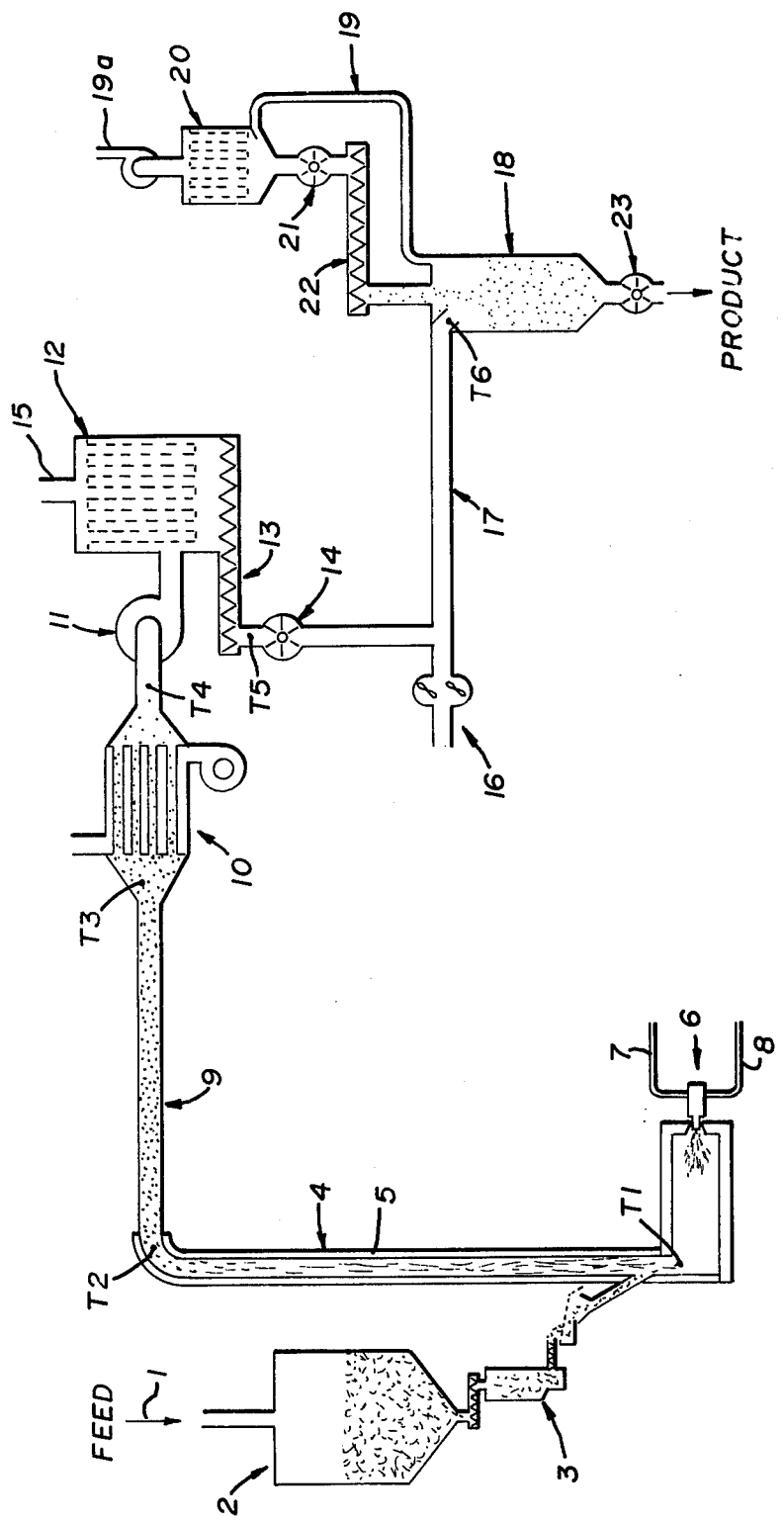
FIG. 1 represents a schematic flow diagram illustrating the process of the invention.

With particular reference to the drawings, especially FIG. 1, the gypsum, natural or synthetic, finely sized feed material 1 is discharged from a material handling device not shown into feed bin 2 and introduced via appropriate feeding means such as metering-screw feeder 3 into the hot gases in Stokes reactor tube 4 which is insulated as by refractory 5, wherein the gypsum particles come into intimate linear flow contact with the hot gases.

The preferred gypsum feed material is as-mined natural gypsum rock that has been pre-ground to about generally 1200 square centimeters per gram. The size classification of the feed material may range from about 800 to about 2000 square centimeters per gram. While natural gypsum rock is preferred; calcium sulfate dihydrate particles of the size classification may come from other sources such as the dihydrate particles derived from various chemical processes as a by- or co-produced product, for example as obtained in the preparation of phosphoric acid by the wet process, titanium The hot gases are provided by combustion burner 6 fed by ambient air 7 to support combustion of the fuel 8, which may be any available gaseous, liquid, or pulverized fossil fuel discharging into Stokes reactor 4 at point $T_1$. The feed material 1 entering the heating zone at about that point is at ambient temperature. Of course, generally speaking, in practice the variables of the particle size of the feed material solids, the intimacy of the co-current contact of solids-gases, and linear flow of particles and hot gases in the calcining zone, as well as the length and diameter particulars for any particular Stokes reactor, solid and gas mass transfer rates, surfaces exposed, and the like variables will vary the process of the present invention parameters to achieve the fundamental co-current calcination to free the gypsum of its water of crystallization without chemical decomposition yet with self-comminution of the feed particles. However, generally speaking, it has been found in practice that maintaining an average velocity through for example a Stokes reactor tube and reactor extension tube having a total length of about 150 feet of approximately 150 feet per second and an average retention time, theoretically, of 1 second provides the desired product. Because of acceleration losses, average particle velocity in air-veying systems are considered to be about half of conveying gas velocity; therefore an actual average retention time is on the order of 2 seconds.

The hot gases and calcining material feed are in linear co-current flowing contact for movement of the calcining gypsum particles through the Stokes reactor tube 4, in contrast with any sort of turbulent, cyclonic vortex flow. It is important to maintain such flow to avoid the material handling problems of, particularly, particle-to-particle or particle-to-reactor contact causing a disintegration into an unreasonably large amount of fines and to maintain a uniformly narrow range of product size distribution through the process.

Figure 2A:
FIGS. 2 (a) through (d) are scanning electron microscope photographs of, respectively, the product of this invention; the prior art product; and the feed material for the process of this invention at two different magnifications.
Figure 2B:
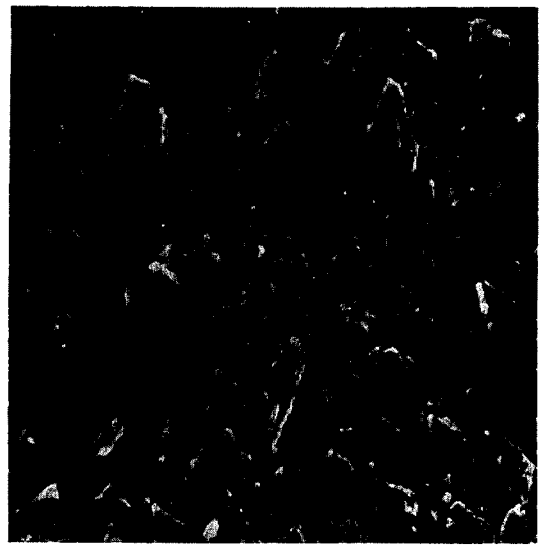

The feed material is not pre-heated before direct injection into the hot gas area of the calcination apparatus; and, it is believed that the injection of the cool ambient temperature feed material instantly into the hottest part of the calcination zone of the reactor causes such a rapid vaporization and evolution of the associated two molecules of water of crystallization in the gypsum dihydrate molecule that the gypsum particle mass is disrupted. This is more particularly seen, with reference to FIGS. 2 (a) through (d). FIG. 2(a) is a scanning electron microphotograph at 600 power magnification of product of the present invention, contrasting a beehive kiln product of the prior processes. The prior process product, FIG. 2(b), is characterized in a large number of slender needle-like crystal configurations which result in less packing and a lower bulk density to that product. The product of this invention, FIG. 2(a), is more amorphous and much less acicular, resulting in different sorbtive characteristics of the particle and in lower pouring consistensies with fluids. Further it exhibits generally higher bulk densities than the prior product of FIG. 2(b) because of the differences in particle configuration. However analysis and inspection of the FIG. 2(a) product still shows it to be calcium sulfate without chemical decomposition forms being present.

From the Stokes reactor tube 4 the gases and calcined materials are conducted into an un-insulated calcining extension 9 of the reactor 4 where the now dehydrated and size-reduced particles continue to react and begin to cool before passing into an indirect heat exchanger 10 equipped with a fan blowing cool ambient air whereby the temperature of the product is further reduced. A primary induction fan 11 is attached to the air cooled heat exchanger 10 to provide suction to promote the passage of the gas flow and particles from the reactor tube 4 through the cooled heat exchanger 10 and for maintaining the velocity provided by the combustion gases from heated air combustion burner 6. Thereafter, the partially cooled particles-gas stream enters a primary bag collector 12 or equal where the solids are collected and discharged from the unit by means of discharge screw 13 or the like and then through rotary air lock valve 14. Gases and water vapor venting from the bag collector 12 or equal through exhaust duct 15 generally will not contain any solids material due to its efficiency; but if other collectors are used it may be desired to include subsequent particle emission control of the venting gases.

The somewhat cooled and now separated product passes from the air lock 14, with an assist by positive displacement blower 16 introducing ambient temperature cooling air, through a secondary cooling extension 17, which is exposed to ambient air, into the product collector 18, a collection bin or equal. From the primary product collector 18 or equal, gases containing some solids materials are discharged through exhaust vent 19 to a secondary bag collector 20 or equal where any entrained solids are collected and fed by rotary air lock 21 and feed screw 22 back into the product collector 18. Clean air passing through vent 19 is discharged to the atmosphere via exhaust vent 19a. Collected desired product in primary product collector 18 is passed via product rotary valve 23 to storage or packaging, with optional finish grinding to fit particular customers requirements.

EXAMPLE

The following is an example of an illustrative mode of carrying out the process of this invention, specifically related to the efficient simultaneous flash calcination dehydration, without chemical decomposition, and concommitant self-comminution of a particular natural gypsum dihydrate, although it is to be recognized that the process is applicable to any calcium sulfate dihydrate containing material, whether natural or synthetically produced and regardless of the purity or content of calcium sulfate dihydrate therein, into an insoluble calcium sulfate anhydrite.

In typical operation referring to FIG. 1, ground natural calcium sulfate dihydrate land plaster as shown in the Table No. 1 was fed to a 50 foot Stokes reactor tube 4 having a 100 foot extension 9 at a rate of 4.5 tons per hour feed material input to obtain calcium sulfate anhydrite at a product output rate of 3.5 tons per hour. The difference in input-output rates is due to the water vapor weight loss in the calcination venting to the atmosphere at vents 15. The finished product was lightly finish ground for comparative product comparison and analysis as set forth in Table No. 1. The Stokes reactor tube is provided with combustion gases entering at about 5000 standard cubic feet per minute at the beginning of the calcining zone (at point $T_1$) to convey the particles through the calcining zone (to point $T_3$) in a retention time of about 2 seconds. The temperatures throughout the process were maintained as follows by adjustments to the burner with reference to the various temperature stages, as shown in FIG. 1:

$T_1 = 2100°$ F
$T_2 = 1400°$ F
$T_3 = 1100°$ F
$T_4 = 350°$ F
$T_5 = 325°$ F
$T_6 = 200°$ F

Figure 2C:
Figure 2D:
Figure 3:
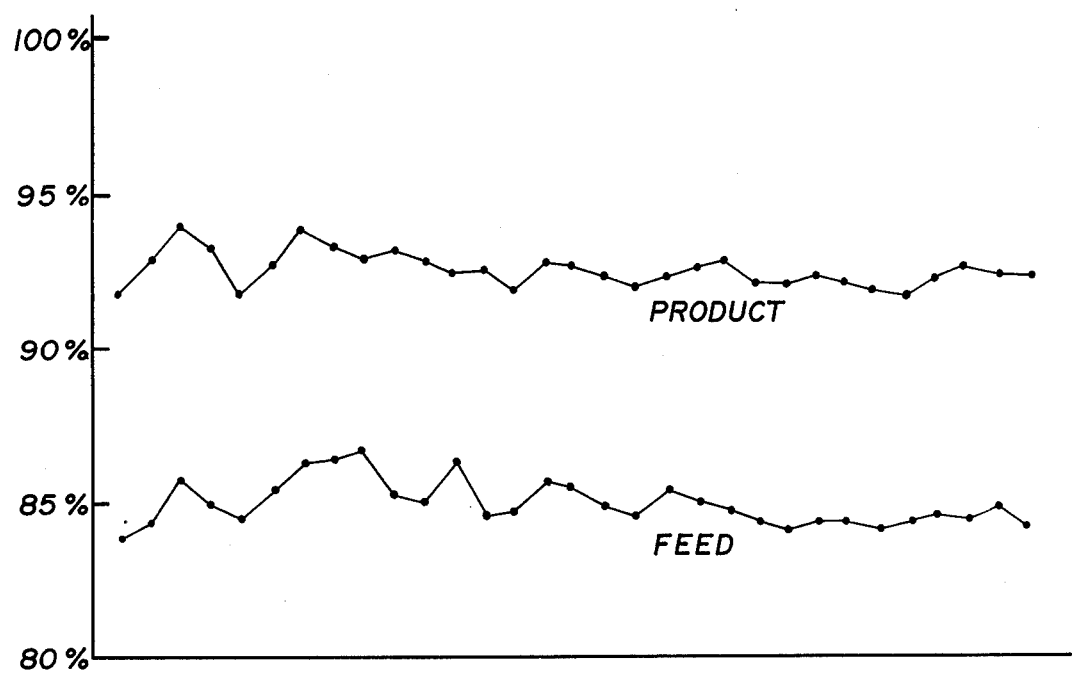
FIG. 3 is a graphic comparison of the reflective whiteness color improvement from the feed material to the finished product.
Figure 4:
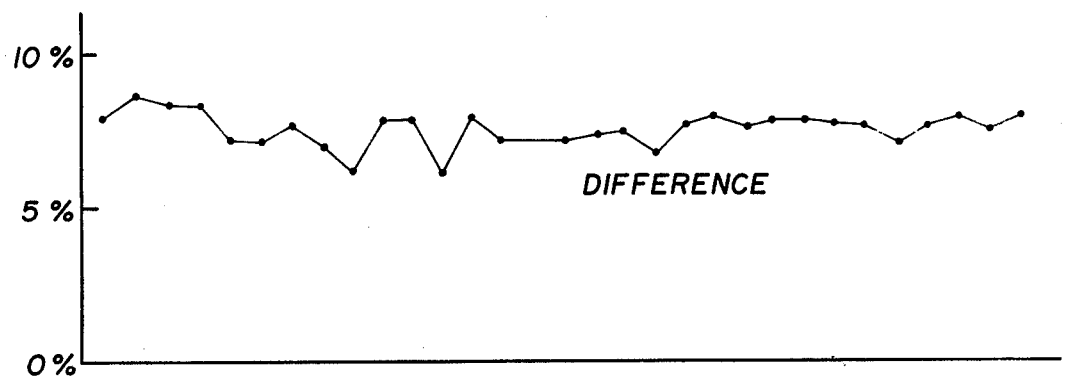
FIG. 4 is a graphic representation of the difference between the reflective whiteness color of the feed material and that of the finished product.

In a comparative run, calcium sulfate anhydrite from specially selected dihydrate feed material was produced by the beehive kiln process as described hereinbefore and the product as set forth in FIG. 2b had the characteristics set forth in Table No. 2. The two Tables set forth typical results in a number of runs. From the Tables and from FIGS. 2(a), 2(c) and 2(d) depicting one of those runs about 4 fold and about 6 fold size reductions are clearly evident. It is noted that the feed particle FIG. 2(c) at the same magnification is about six times larger than the calcined product FIG. 2(a); while the feed particle at one-sixth the magnification, FIG. 2(d), shows about the same size as the calcined product 2(a). To show uniformity of replication, samples from over twenty runs were evaluated for whiteness index, the results of which are set forth in FIGS. 3 and 4.

TABLE 1

TYPICAL FLASH-CALCINATION PROCESS

| Item | Feed Material | Calcined Material | Finish-Ground Product |
|---|---|---|---|
| Purity as $CaSO_4 \cdot 2H_2O$ (%) | 97.7 | — | — |
| Purity as $CaSO_4$ (%) | 77.2 | 97.0 | 97.0 |
| Specific gravity | 2.32 | 2.86 | 2.86 |
| Fineness (Surface Area, $cm^2/gm$.) | 1200 | 5400 | 7800 |
| Whiteness (%) | 85 | 92 | 93 |
| Bulk Density (#Ft.$^3$) | — | — | 59.5 |
| Normal Pouring Consistency (cc/100 gm.) | — | — | 57 |
| Mortar Consistency (cc/100 gm.) | — | — | 42 |
| Calcination Time | — | 2 Sec. | — |

TABLE 2

TYPICAL BEEHIVE KILN PROCESS

| Item | Feed Material | Calcined Material | Finish-Ground Product |
|---|---|---|---|
| Purity as $CaSO_4 \cdot 2 H_2O$ (%) | 99.2 | — | — |
| Purity as $CaSO_4$ | 78.3 | 99.0 | 99.0 |
| Specific Gravity | 2.32 | 2.905 | 2.905 |
| Fineness (Surface Area, $cm^2/gm$.) | 4"–12" Chunks | 4"–12" Chunks | 9,000 |
| Whiteness (%) | — | — | 94.2 (Min.) |
| Bulk Density (#/Ft.$^3$) | — | — | 57.9 |
| Normal Pouring Consistency (cc/100 gm.) | — | — | 63 |
| Mortar Consistency (cc/100 gm.) | — | — | 43 |
| Calcination Time | — | 72 Hours | — |

It will be apparent from the above description of the invention and the drawings that various modifications in the process and apparatus described may be made within the scope of the invention. For example it has been found that coarser particle feed provides a greater degree of self-comminution due to the greater amount of water of crystallization for the surface area of the particle providing greater explosive effect of the water vapor being released. Thus a feed size of 800–900 square centimeters per gram generally comminutes to about 6300 square centimeters per gram while a 1600 square centimeter per gram feed generally results in about 5500 square centimeters per gram.

This feed size affects the time and temperature correlation of calcination also. Thus approximately equivalent calcination is provided by particle residence in the calcining zone of about 2 seconds or less with the hot gas entering at 2000° F while 3–5 seconds residence are required when the hot gas is entering at around 1500° F and longer times are required for somewhat lower temperatures. Further the configuration of the calcining reactor tube and extension apparatus may vary to provide generally calcining times of, for example, preferably 1–3 seconds and more generally 1–5 seconds and more as still providing the flash removal of water of crystallization and self-comminution of the particles. In addition the configurations of the calcining zone may be different. For example the horizontal reactor extension may be insulated thus allowing shorter lengths of the vertical reactor tube or the vertical extension eliminated depending on space, size of apparatus and cooling means available. Further the illustrated product cooling means and conveying means may be varied considerably. Therefore, the invention is not intended to be limited to the specific details described herein except as may be required by the following claims.

What is claimed is:

1. A method for producing insoluble calcium sulfate anhydrite characterized in undergoing about greater than four-fold self-comminution during calcining comprising the steps of:
    (1) introducing finely divided calcium sulfate dihydrate particles at ambient temperatures and hot gas into a calcining zone, said gas entering at a temperature of from about 1500° to about 2400° F;
    (2) maintaining co-current linear flow of the particles and gas in the calcining zone; and
    (3) maintaining the particles in the calcining zone for a time sufficient to remove the water of crystallization of the particles while the particles undergo an about four-fold to seven-fold self-comminution, producing insoluble calcium sulfate anhydrite.

2. The method of claim 1 wherein the calcium sulfate dihydrate particles have an average surface area in the range of about 800 to about 2,000 square centimeters per gram; and the calcium sulfate anhydrite particles have an average surface area in the range of about 3,000 to about 10,000 square centimeters per gram.

3. The method of claim 2 wherein the calcium sulfate dihydrate particles have an average surface area of about 1000 square centimeters per gram; and the calcium sulfate anhydrite particles have an average surface area of about 5,000 square centimeters per gram.

4. The method of claim 1 wherein the hot gas and calcium sulfate dihydrate particles enter a vertically disposed and then horizontally disposed calcining zone and the dispersed particles pass in an upwardly flowing and then horizontally flowing hot gas stream in a linear fashion whereby the particles undergo dehydration and comminution.

5. The method of claim 4 wherein the particles have a residence time in the vertically and horizontally disposed calcining zone on the order of about 2 seconds.

6. The method of claim 1 wherein the particles entering the calcining zone have a temperature of about 70° F and the hot gas entering the calcining zone has a temperature of about 2000° F.

7. The method of claim 1 wherein the particles are maintained in the calcining zone for from about 1 to about 5 seconds.

8. The method of producing insoluble calcium sulfate anhydrite characterized in flash calcination with an about four-fold to about seven-fold self-comminution of the calcining particles comprising the steps of:
    (1) feeding calcium sulfate dihydrate particles having an average surface area on the order of about 1000 square centimeters per gram at a temperature of about 70° F into a vertically disposed calcining zone;
    (2) feeding hot gas at a temperature of about 2000° F into the calcining zone;
    (3) rapidly passing the dispersed particles in an upwardly flowing and then horizontally flowing hot gas stream in co-current linear fashion in about 2 seconds whereby the water of crystallization of the hydrate particles is flashed off without chemical decomposition of the calcium sulfate and the particles undergo comminution;
    (4) cooling the calcined particles; and
    (5) recovering insoluble calcium sulfate anhydrite particles having an average surface area on the order of about 5,000 square centimeters per gram.

9. The method of claim 8 including steps continuously feeding calcium sulfate dihydrate particles and hot gas to the calcining zone and continuously recovering calcium sulfate anhydrite particles.

* * * * *